US010515135B1

(12) United States Patent
Zejda et al.

(10) Patent No.: US 10,515,135 B1
(45) Date of Patent: Dec. 24, 2019

(54) DATA FORMAT SUITABLE FOR FAST MASSIVELY PARALLEL GENERAL MATRIX MULTIPLICATION IN A PROGRAMMABLE IC

(71) Applicant: Xilinx, Inc., San Jose, CA (US)

(72) Inventors: Jindrich Zejda, Saratoga, CA (US); Elliott Delaye, San Jose, CA (US); Aaron Ng, San Jose, CA (US); Ashish Sirasao, San Jose, CA (US); Yongjun Wu, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 78 days.

(21) Appl. No.: 15/785,688

(22) Filed: Oct. 17, 2017

(51) Int. Cl.
*G06F 17/16* (2006.01)
*G06F 7/53* (2006.01)
*G06F 17/12* (2006.01)

(52) U.S. Cl.
CPC ............ *G06F 17/16* (2013.01); *G06F 7/5324* (2013.01); *G06F 17/12* (2013.01); *G06F 2207/4812* (2013.01)

(58) Field of Classification Search
None
See application file for complete search history.

(56) References Cited

U.S. PATENT DOCUMENTS

| | | | |
|---|---|---|---|
| 6,346,825 B1 | 2/2002 | Pang et al. | |
| 7,248,491 B1 * | 7/2007 | Ching | G11C 7/1075 365/230.05 |
| 7,792,895 B1 * | 9/2010 | Juffa | G06F 17/16 708/607 |
| 8,705,300 B1 * | 4/2014 | Xu | G11C 5/147 365/154 |
| 9,208,858 B1 * | 12/2015 | Lin | G11C 11/419 |

OTHER PUBLICATIONS

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.
Chetlur, Sharan et al., "cuDNN: Efficient Primitives for Deep Learning," submitted Oct. 3, 2014, pp. 1-9, https://arxiv.org/pdf/1410.0759.pdf, Cornell University Library.
(Continued)

*Primary Examiner* — Michael D. Yaary
(74) *Attorney, Agent, or Firm* — Steven Roberts; Krista Chan

(57) ABSTRACT

Methods and apparatus are described for performing data-intensive compute algorithms, such as fast massively parallel general matrix multiplication (GEMM), using a particular data format for both storing data to and reading data from memory. This data format may be utilized for arbitrarily-sized input matrices for GEMM implemented on a finite-size GEMM accelerator in the form of a rectangular compute array of digital signal processing (DSP) elements or similar compute cores. This data format solves the issue of double data rate (DDR) dynamic random access memory (DRAM) bandwidth by allowing both linear DDR addressing and single cycle loading of data into the compute array, avoiding input/output (I/O) and/or DDR bottlenecks.

20 Claims, 11 Drawing Sheets

(56) References Cited

OTHER PUBLICATIONS

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.
Gysel, Philipp, "Ristretto: Hardware-Oriented Approximation of Convolutional Neural Networks," May 20, 2016, pp. 1-73, https://arxiv.org/abs/1605.06402, Cornell University Library.
Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.
Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.
Mathworks, "im2col," dowloaded Sep. 22, 2017 from https://www.mathworks.com/help/images/ref/im2col.html?searchHighlight=im2col&s_tid=doc_srchtitle, pp. 1-3.
Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.
Shaaban, Muhammed, "Systolic Architectures," Mar. 11, 2003, Kate Gleason College of Engineering, Rochester Institute of Technology, Rochester, New York, USA.
Stanford, "CS231n Convolutional Neural Networks for Visual Recognition," downloaded Sep. 25, 2017 from http://cs231n.stanford.edu/, pp. 1-23, Stanford University, Stanford, California, USA.
Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.
Wikipedia, "Convolutional neural network," Sep. 20, 2017, pp. 1-13, downloaded from https://en.wikipedia.org/wiki/Convolutional_neural_network.
Wikipedia, "Deep learning," Sep. 24, 2017, pp. 1-13, downloaded from https://en.wikipedia.org/wiki/Deep_learning.
Wikpedia, "Matrix Multiplication," Sep. 20, 2017, pp. 1-19, downloaded from https://en.wikipedia.org/wiki/Matrix_multiplication.
Wikipedia, "Multiprocessing," May 10, 2017, pp. 1-4, dowloaded from https://en.wikipedia.org/wiki/Multiprocessing.
Wikipedia, "Producer-consumer problem," Sep. 7, 2017, pp. 1-9, downloaded from https://en.wikipedia.org/wiki/Producer%E2%80%93consumer_problem.
Wikipedia, "Row- and colum-major order," Aug. 23, 2017, pp. 1-5, downloaded from https://en.wikipedia.org/wiki/Row-_and_column-major_order.
Wikipedia, "Systolic array," Mar. 22, 2017, pp. 1-5, downloaded from https://en.wikipedia.org/wiki/Systolic_array.
Wikipedia, "Very long instruction word," Jul. 13, 2017, pp. 1-3, downloaded from https://en.wikipedia.org/wiki/Very_long_instruction_word.
Xilinx, "Smarter Data Center," downloaded Sep. 22, 2017 from https://www.xillinx.com/applications/data-center.html, pp. 1-4, Xilinx, Inc., San Jose, California, USA.
Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.
Xilinx, "UltraScale Architecture DSP Slice User Guide," UG579 (v1.3), Nov. 24, 2015, pp. 1-74, Xilinx, Inc., San Jose, California, USA.
Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.
Xilinx, "Deep Learning with INT8 Optimization on Xilinx Devices," WP486 (v1.0.1), Apr. 24, 2017, pp. 1-11, Xilinx, Inc., San Jose, California, USA.
Xilinx, "Implementing Memory Structures for Video Processing in the Vivado HLS Tool," XAPP793 (v1.0), Sep. 20, 2012, pp. 1-8, Xilinx, Inc., San Jose, California, USA.
Xilinx, "Two-Dimensional Linear Filtering," XAPP933 (v1.1), Oct. 23, 2007, pp. 1-8, Xilinx, Inc., San Jose, Cafifomia, USA.

\* cited by examiner

DATA FORMAT SUITABLE FOR FAST MASSIVELY PARALLEL GENERAL MATRIX MULTIPLICATION IN A PROGRAMMABLE IC

TECHNICAL FIELD

Examples of the present disclosure generally relate to electronic circuits and, in particular, to a data format suitable for fast massively parallel general matrix multiplication, for example.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms may be unsupervised (e.g., pattern analysis) or supervised (e.g., classification). The deep learning algorithm may be implemented using layers of an artificial neural network (ANN) (referred to herein as a "neural network").

In general, a neural network is a collection of nodes (i.e., the "neurons") that are connected (e.g., in a graph). A node in a neural network may compute a sum of weighted inputs and may add an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and may optionally include one or more hidden layers between the input and output layers. A neural network used in deep learning applications typically includes many hidden layers, which gives rise to the term deep neural network (DNN). The layers of a neural network may be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

SUMMARY

Examples of the present disclosure generally relate to a data format suitable for fast massively parallel general matrix multiplication, which may be implemented by a programmable integrated circuit (IC), for example. This data format may also be suitable for applications other than general matrix multiplication.

One example of the present disclosure is a method for multiplying matrices in hardware. The method generally includes determining a row size and a column size of a compute array in a compute circuit; reading, from a first memory, elements of a first matrix in a column-major order for each of a plurality of first partitions of the first matrix having the same row size as the compute array; reading, from a second memory, elements of a second matrix in a row-major order for each of a plurality of second partitions of the second matrix having the same column size as the compute array; and multiplying, using the compute array, the first matrix by the second matrix according to the read elements of the first and second matrices to generate a third matrix. The compute circuit may comprise a digital signal processing (DSP) circuit, for example.

Another example of the present disclosure is an electronic circuit. The electronic circuit generally includes a first memory configured to store elements of a first matrix; a second memory configured to store elements of a second matrix; and a compute circuit comprising a compute array having a row size and a column size, the compute circuit being coupled to the first memory and the second memory. The compute circuit is generally configured to read, from the first memory, the elements of the first matrix in a column-major order for each of a plurality of first partitions of the first matrix having the same row size as the compute array; to read, from the second memory, elements of the second matrix in a row-major order for each of a plurality of second partitions of the second matrix having the same column size as the compute array; and to multiply, using the compute array, the first matrix by the second matrix according to the read elements of the first and second matrices to generate a third matrix.

Yet another example of the present disclosure is a method of processing matrices in hardware. The method generally includes determining a row size and a column size of a compute array in a compute circuit; reading, from a first memory, elements of a first matrix in a column-major order for each of a plurality of first partitions of the first matrix having the same row size as the compute array; storing, in a second memory, the read elements of the first matrix in sequence; reading, from a third memory, elements of a second matrix in a row-major order for each of a plurality of second partitions of the second matrix having the same column size as the compute array; and storing, in a fourth memory, the read elements of the second matrix in sequence.

These and other aspects may be understood with reference to the following detailed description.

BRIEF DESCRIPTION OF THE DRAWINGS

So that the manner in which the above-recited features of the present disclosure can be understood in detail, a more particular description of the disclosure, briefly summarized above, may be had by reference to example implementations, some of which are illustrated in the appended drawings. It is to be noted, however, that the appended drawings illustrate only typical example implementations and are therefore not to be considered limiting of its scope, for the disclosure may admit to other equally effective examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
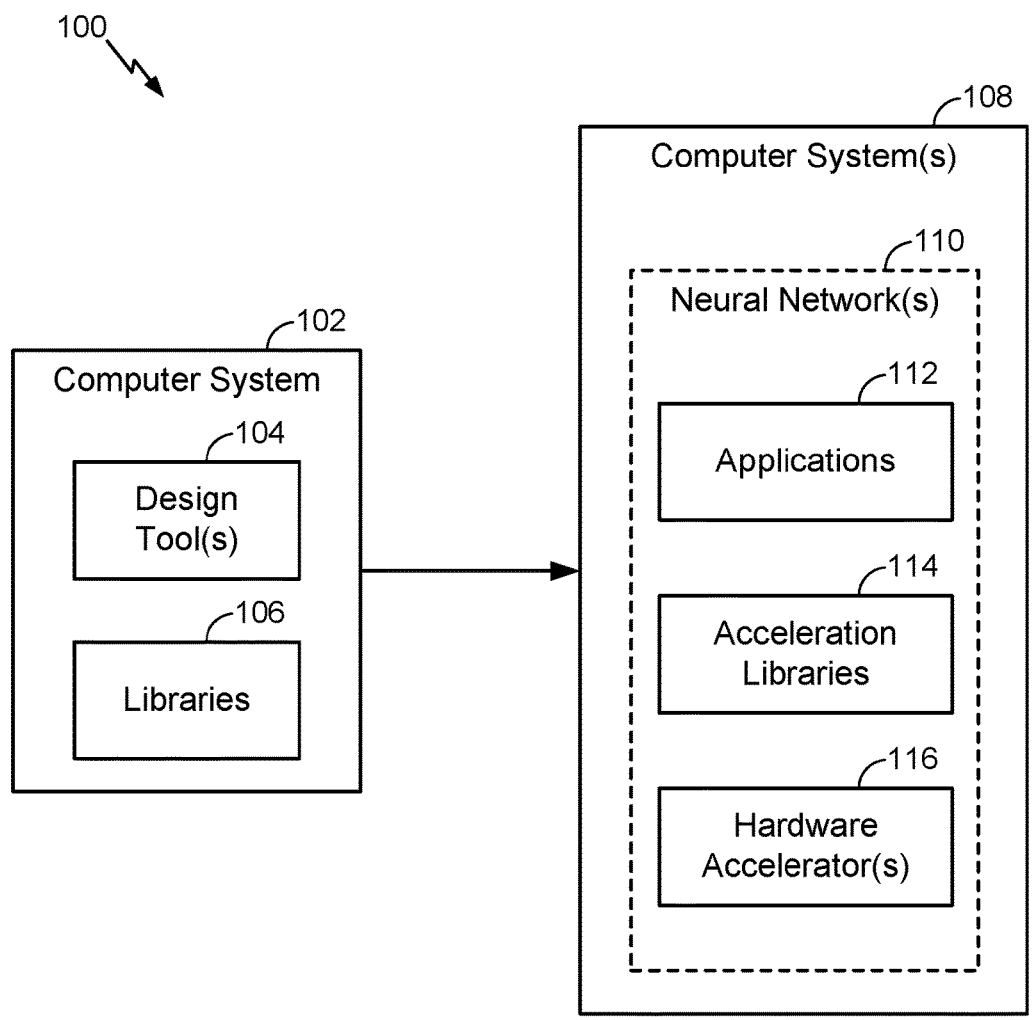
FIG. 1 is a block diagram depicting a system for implementing artificial neural networks, in accordance with an example of the present disclosure.

Examples of the present disclosure provide techniques and apparatus for fast massively parallel general matrix multiplication (GEMM) and/or other applications using a particular data format for storing data to and/or reading data from memory. This data format may be utilized for arbitrarily-sized input matrices for GEMM implemented on a finite-size GEMM accelerator in the form of a rectangular compute array of digital signal processing (DSP) elements or similar compute cores. This data format solves the issue of double data rate (DDR) dynamic random access memory (DRAM) bandwidth by allowing both linear DDR addressing and single cycle loading of data into the compute array, avoiding input/output (I/O) and/or DDR bottlenecks.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples, even if not so illustrated or if not so explicitly described.

Example System for Artificial Neural Network Implementation

FIG. 1 is a block diagram depicting a system 100 for implementing neural networks, in accordance with an example of the present disclosure. The system 100 includes a computer system 102 and one or more computer systems 108. The computer system 102 includes conventional computing components configured to execute software that provides one or more design tools 104. Each computer system 108 may execute one or more neural networks 110. The neural network(s) 110 may be implemented using applications 112, acceleration libraries 114, and/or one or more hardware accelerators 116.

For some examples, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 may also include libraries that provide neural network functions, including predefined and optimized implementations of neural network layers and other types of neural network structures. Thus, the neural network(s) 110 may include both hardware portions (implemented in the hardware accelerator(s) 116) and software portions (implemented in the acceleration libraries 114). The applications 112 invoke the APIs of the acceleration libraries 114 to program and control the hardware accelerator(s) 116 to implement the neural network(s) 110.

A designer interacts with the design tool(s) 104 to define the neural network(s) 110. The design tool(s) 104 may generate files for programming the hardware accelerator(s) 116 (e.g., configuration bitstreams for FPGAs), files that provide the acceleration libraries 114, and files that provide the applications 112. The designer may define the hardware portions of the neural network(s) 110 using a register transfer language (RTL) or using a programming language, such as C, C++, OpenCL, and the like, or a combination of RTL and programmable language(s). The user may define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer may make use of libraries 106 that provide class libraries, template libraries, and the like to assist in developing the hardware and software portions of the neural network(s) 110.

A user may define the applications 112 using a programming language (e.g., C, C++, Python, etc.). The user may make use of neural network frameworks and libraries, such as Caffe, TensorFlow, MXNet, and the like.

Figure 2:
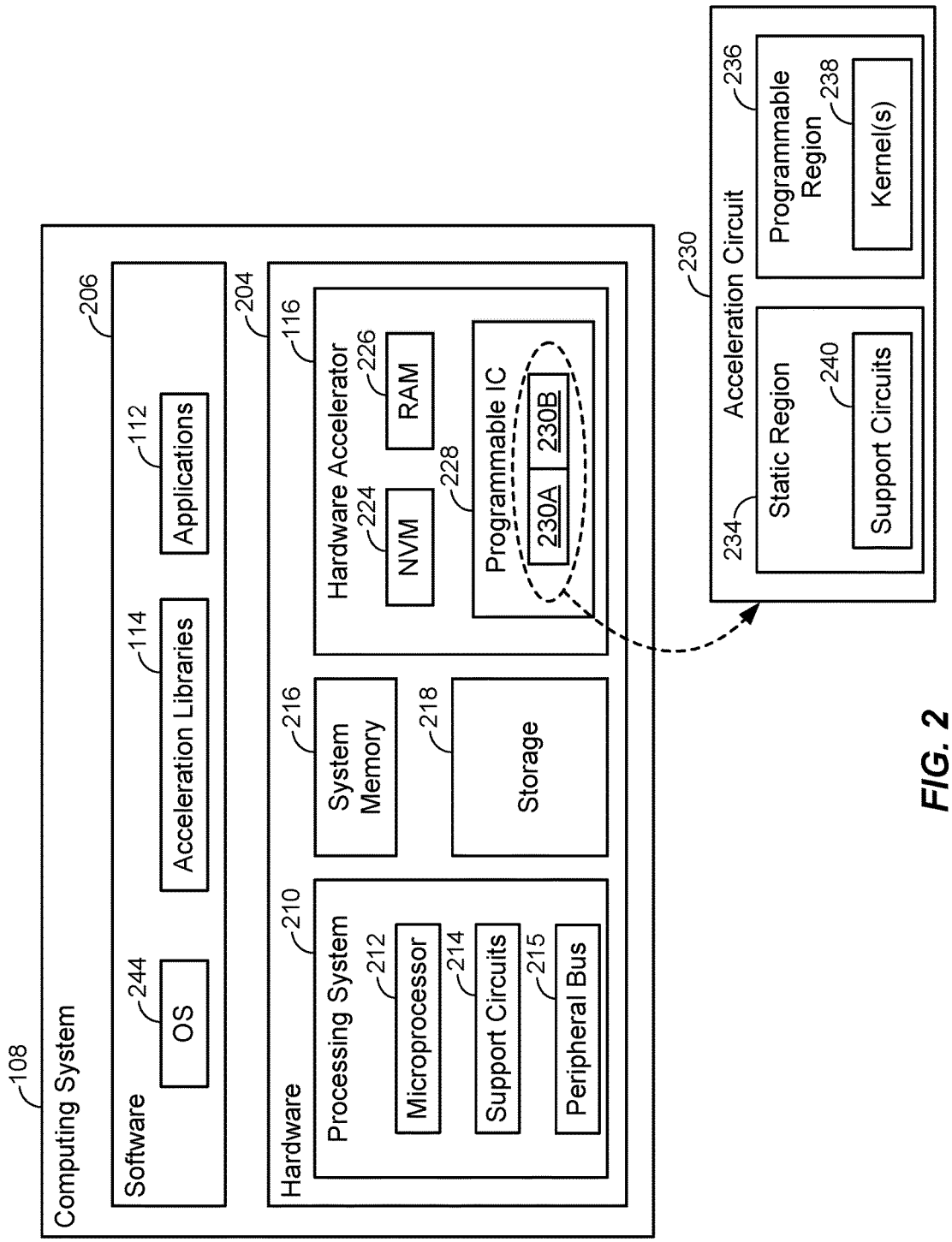
FIG. 2 is a block diagram depicting a computing system, in accordance with an example of the present disclosure.

FIG. 2 is a block diagram depicting a computer system 108, in accordance with an example of the present disclosure. The computer system 108 includes hardware 204 and software 206 executing on the hardware 204. The hardware 204 includes a processing system 210, system memory 216, storage devices ("storage 218"), and a hardware accelerator 116. The software 206 includes an operating system (OS) 244, the acceleration libraries 114, and the applications 112.

The processing system 210 includes a microprocessor 212, support circuits 214, and a peripheral bus 215. The microprocessor 212 may be any type of general-purpose central processing unit (CPU), such as an x86-based processor, ARM-based processor, or the like. The microprocessor 212 may include one or more cores and associated circuitry (e.g., cache memories, memory management units (MMUs), interrupt controllers, etc.). The microprocessor 212 is configured to execute program code that performs one or more operations described herein and which may be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 may include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 may be a system-in-package (SiP), system-on-chip (SoC), or the like, which absorbs all or a substantial portion of the functionality of the chipset (e.g., north bridge, south bridge, etc.). The peripheral bus may implement an expansion bus standard, such as Peripheral Component Interconnect Express (PCIe). In the example of FIG. 2, the processing system 210 is shown separate from the hardware accelerator 116. In other examples discussed further below, the processing system 210 and the hardware accelerator 116 may be implemented on the same IC (e.g., using an SoC).

The system memory 216 is a device allowing information, such as executable instructions and data, to be stored and retrieved. The system memory 216 may include, for example, one or more random access memory (RAM) modules, such as double data rate (DDR) dynamic RAM (DRAM). The storage 218 includes local storage devices (e.g., one or more hard disks, flash memory modules, solid state disks, and optical disks) and/or a storage interface that enables the computer system 108 to communicate with one or more network data storage systems. The hardware 204 may include various other conventional devices and peripherals of a computing system, such as graphics cards, universal serial bus (USB) interfaces, and the like.

The hardware accelerator 116 includes a programmable IC 228, a non-volatile memory (NVM) 224, and RAM 226. The programmable IC 228 may be an FPGA or the like or an SoC having an FPGA or the like. The NVM 224 may include any type of non-volatile memory, such as flash memory or the like. The RAM 226 may include DDR DRAM or the like. The programmable IC 228 is coupled to the NVM 224 and the RAM 226. The programmable IC 228 is also coupled to the peripheral bus 215 of the processing system 210.

The OS 244 may be any commodity operating system known in the art, such as such as Linux®, Microsoft Windows®, Mac OS®, or the like. The acceleration libraries 114 include drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. For some examples, the acceleration circuit 230 may be a neural network accelerator or any other various suitable types of hardware accelerators. The acceleration circuit 230 generally includes a base platform 230A and a kernel 230B. For example, the acceleration circuit 230 may be implemented using a static region 234 and a programmable region 236. The static region 234 includes support circuits 240 for providing an interface to the peripheral bus 215, the NVM 224, and the RAM 226. The programmable region 236 may include one or more kernel circuits ("kernel(s) 238"). The base platform 230A is implemented using the static region 234, and the kernel 230B is implemented using the programmable region 236. In another example, the base platform 230A may also be implemented using a portion of the programmable region 236. Thus, in some examples, the programmable region 236 also includes some interface circuits. In some examples, the acceleration circuit 230 may include more than one programmable region 236, each of which may be individually configured with kernel(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 236 does not include any of the support circuits 240. In other examples, some support circuits are implemented in the programmable region 236. In such a case, the programmable region 236 may be referred to as an "expanded programmable region." In either case, in one example, some support circuits 240 are typically present in the static region 234, such as the PCIe circuits and the DMA circuits.

Figure 3:
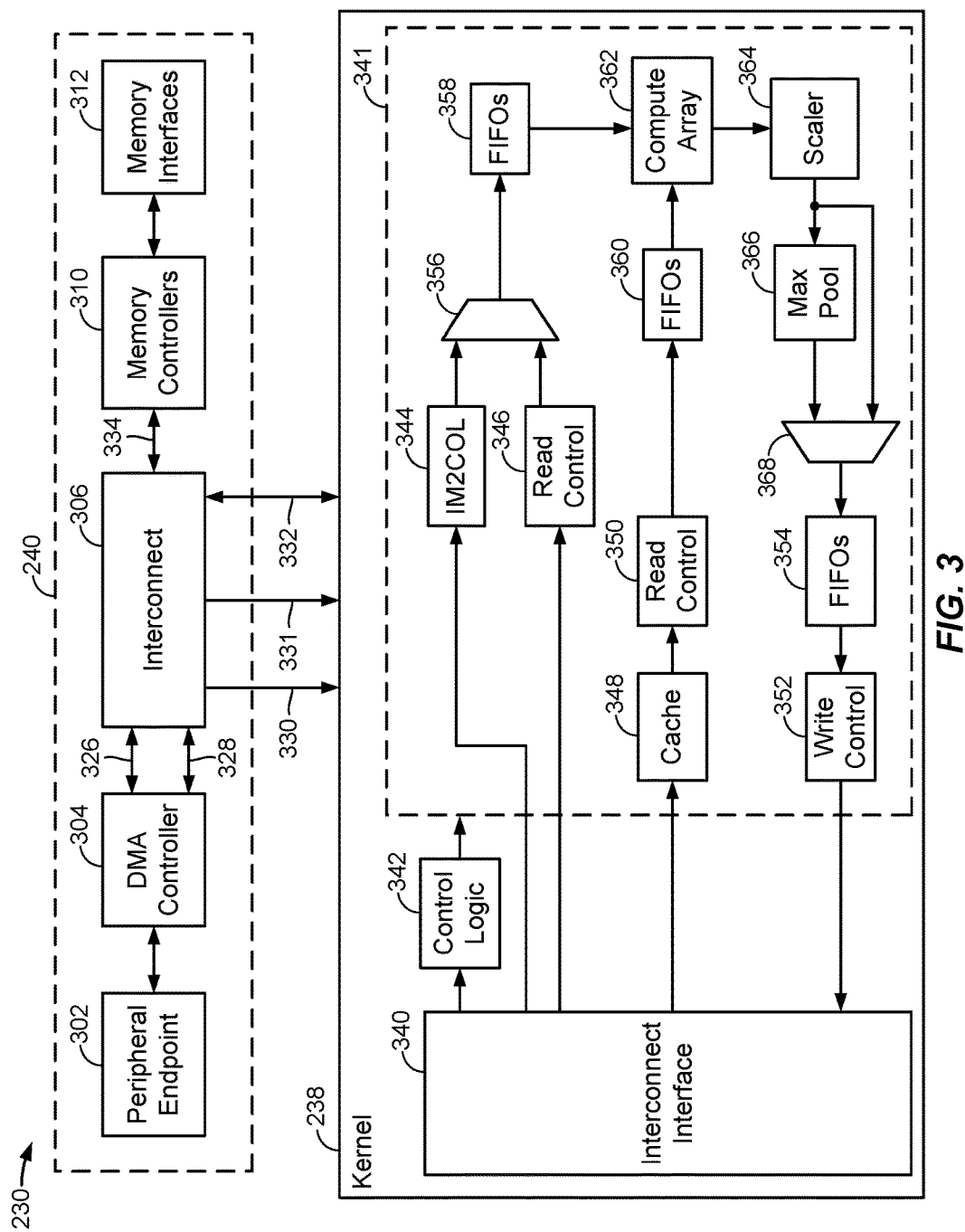
FIG. 3 is a block diagram depicting an acceleration circuit, in accordance with an example of the present disclosure.

FIG. 3 is a block diagram depicting an acceleration circuit 230, in accordance with an example of the present disclosure. The acceleration circuit 230 includes the support circuits 240 and a kernel 238. In the example, the support circuits 240 include a peripheral endpoint circuit ("peripheral endpoint 302"), a PCIe DMA controller 304, interconnect circuits ("interconnect 306"), memory controllers 310, and memory interfaces 312. The support circuits 240 may include other circuits, which are omitted for clarity (e.g., decoupler circuits, debug circuits, etc.). The peripheral endpoint 302 (e.g., a PCIe endpoint circuit) provides a physical interface to the peripheral bus 215. The PCIe DMA controller 304 facilitates DMA operations to the RAM 226 and the kernel 238. The interconnect 306 couples the PCIe DMA controller 304 to the memory controllers 310 and to the kernel 238. The memory controllers 310 are coupled to the memory interfaces 312. The memory interfaces 312 are coupled to the RAM 226.

In operation, the acceleration libraries 246 may access the RAM 226 directly through the PCIe DMA controller 304. The acceleration libraries 246 may also access the kernel 238 through the PCIe DMA controller 304. The kernel 238 may access the RAM 226 through the memory controllers 310. Data may be exchanged between the software 206 and the kernel 238 using DMA operations between the system memory 216 and the RAM 226.

In the example, the kernel 238 uses interfaces 330, 331, and 332 to communicate with the interconnect 306. In particular, these interfaces include a first read interface 330, a second read interface 331, and a read/write interface 332. For example, the read interface 330 may be used as a control interface for controlling the kernel 238. The read interface 331 may be used to read from the RAM 226 through a first one of the memory interfaces 312. The read/write interface 332 may be used to read and write from the RAM 226 through a second one of the memory interfaces 312.

The kernel 238 includes an interconnect interface 340, control logic 342, and processing circuits 341. The processing circuits 341 may include an IM2COL circuit ("IM2COL 344"), a read control circuit ("read control 346"), a multiplexer 356, first-in-first-out circuits ("FIFOs 358"), a compute array 362, a scaler circuit ("scaler 364"), a max pool circuit ("max pool 366"), a multiplexer 368, FIFOs 354, a 3-D partitioning block order unit (not shown), a write control circuit ("write control 352"), a write cache 348, a read control circuit ("read control 350"), read caches (not shown), and FIFOs 360. The interconnect interface 340 is coupled to the interfaces 330, 331, and 332, the control logic 342, and the processing circuits 341. The block order unit may provide key inputs to read and write control and cache behavior. The interconnect interface 340 may include switches, clock converters, and the like to facilitate communication between the control logic 342 and the interface 330, as well as between the processing circuits 341 and the interfaces 331 and 332. The compute array 362 may be implemented, for example, by a digital signal processor (DSP), dedicated floating point units, vector floating point or integer units, look-up tables (LUTs), or other compute hardware such as low-precision hard arithmetic logic units (ALUs) or double/complex blocks.

In the example, the interconnect interface 340 is coupled to inputs of the IM2COL circuit 344, the read control circuit 346, and the cache 348, as well as to an output of the write control circuit 352. Outputs of the IM2COL circuit 344 and the read control circuit 346 are coupled to inputs of the multiplexer 356. An output of the multiplexer 356 is coupled to an input of the FIFOs 358. An output of the FIFOs 358 is coupled to a first input of the compute array 362. An output of the cache 348 is coupled to an input of the read control circuit 350. An output of the read control circuit 350 is coupled to an input of the FIFOs 360. An output of the FIFOs 360 is coupled to a second input of the compute array 362. An output of the compute array 362 is coupled to an input of the scaler 364. An output of the scaler 364 is coupled to an input of the max pool circuit 366 and to an input of the multiplexer 368. An output of the max pool circuit 366 is coupled to another input of the multiplexer 368. An output of the multiplexer 368 is coupled to an input of the FIFOs 354, and an output of the FIFOs 354 is coupled to an input of the write control circuit 352.

In operation, the compute array 362 performs matrix multiplication operations for implementing a neural network. The inputs of the compute array 362 receive input activation matrices from the FIFOs 358 and weight matrices from the FIFOs 360. To implement fully connected layers or general purpose matrix multiplication (GEMM), the input activation matrices may be read directly from the RAM 226 using the block order unit, caches, and read control circuit 346. Alternatively, to perform convolution, for example, the input activations may be read from the RAM 226 and processed by the IM2COL circuit 344 for input to the compute array 362. Embodiments of the IM2COL circuit 344 are described below. Weight matrices may be read from the RAM 226 by the block order unit and read control circuit 350 and cached in cache 348. The scaler 364 may scale the output of the compute array 362. The max pool circuit 366 may implement a max pooling function on the scaled output of the scaler 364. In one example, the max pool circuit 366 is implemented using configurable logic blocks (CLBs) or other configurable logic. Either the output of the max pool circuit 366 or the scaler 364 may be stored in the FIFOs 354. The write control circuit 352 writes data in the FIFOs to the RAM 226. The control logic 342 controls the various circuits in the processing circuits 341, such as the IM2COL circuit 344, the 3-D partitioning block order unit, the read control circuit 346, the multiplexers 356 and 368, the read control circuit 350, the scaler 364, the max pool circuit 366, and the write control circuit 352.

Figure 4:
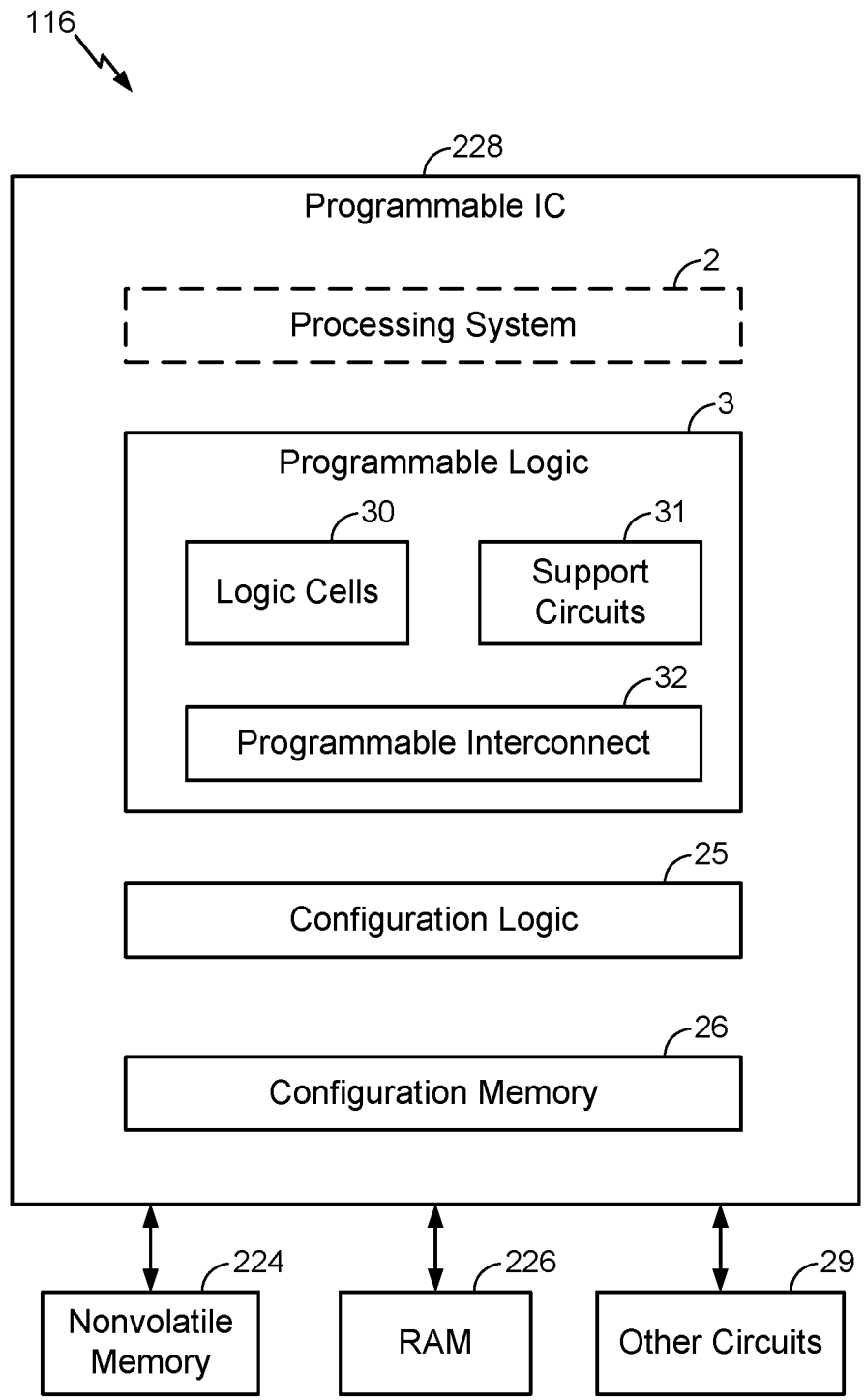
FIG. 4 is a block diagram depicting a programmable integrated circuit (IC), in accordance with an example of the present disclosure.

FIG. 4 is a block diagram depicting a programmable IC 228, in accordance with an example of the present disclosure. The programmable IC 228 includes programmable logic 3, configuration logic 25, and configuration memory 26. The programmable IC 228 may be coupled to external circuits, such as the NVM 224, the RAM 226, and other circuits 29. The programmable logic 3 includes logic cells 30, support circuits 31, and a programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 may be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 may obtain the configuration data from the nonvolatile memory 224 or any other source (e.g., the RAM 226 or from the other circuits 29).

In some examples, the programmable IC 228 includes a processing system 2. The processing system 2 may include microprocessor(s), memory, support circuits, I/O circuits, and the like. For example, the processing system 2 may include circuits similar to the processing system 210. In some examples, the processing system 2 may be used in place of the processing system 210. In this case, the entire computer system 108 may be implemented using the programmable IC 228, where the software 206 executes on the processing system 2.

Figure 5:
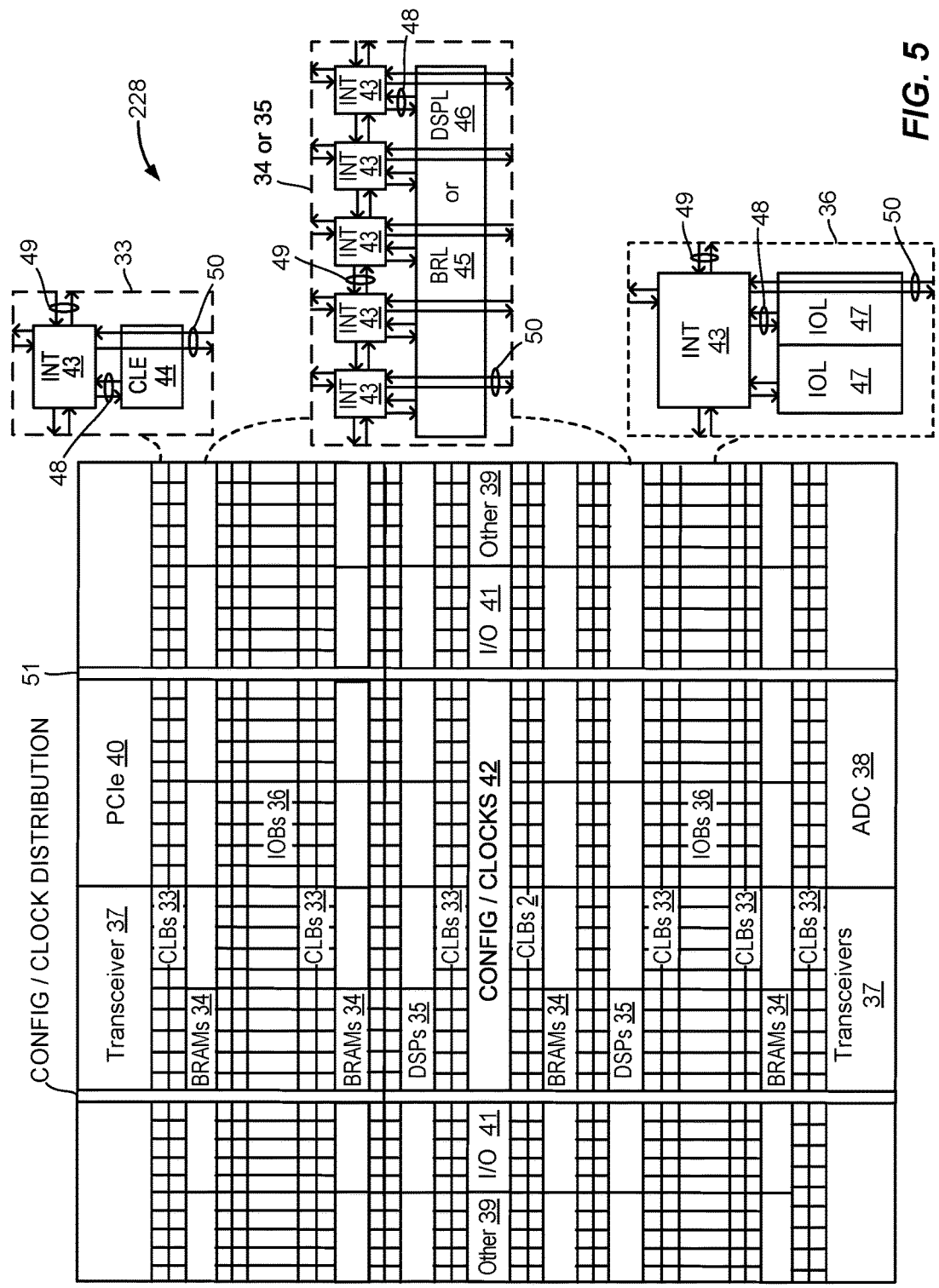
FIG. 5 illustrates a field programmable gate array (FPGA) implementation of a programmable IC, in accordance with an example of the present disclosure.

FIG. 5 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39, such as digital clock managers, analog-to-digital converters, system monitoring logic, and so forth. The FPGA may also include PCIe interfaces 40, analog-to-digital converters (ADCs) 38, and the like.

In some FPGAs, each programmable tile may include at least one programmable interconnect element ("INT") 43 having connections to input and output terminals 48 of a programmable logic element within the same tile, as shown by examples included at the top of FIG. 5. Each programmable interconnect element 43 may also include connections to interconnect segments 49 of adjacent programmable interconnect element(s) in the same tile or other tile(s). Each programmable interconnect element 43 may also include connections to interconnect segments 50 of general routing resources between logic blocks (not shown). The general routing resources may include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) may span one or more logic blocks. The programmable interconnect elements 43 taken together with the general routing resources implement a programmable interconnect structure ("programmable interconnect") for the illustrated FPGA.

In an example implementation, a CLB 33 may include a configurable logic element ("CLE") 44 that may be programmed to implement user logic plus a single programmable interconnect element ("INT") 43. A BRAM 34 may include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) may also be used. A DSP tile 35 may include a DSP logic element ("DSPL") 46 in addition to an appropriate number of programmable interconnect elements. An IOB 36 may include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example of FIG. 5, a horizontal area near the center of the die is used for configuration, clock, and other control logic. Vertical columns 51 extending from this horizontal area or row are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks may be programmable blocks and/or dedicated logic.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Example Data Format Suitable for Fast Massively Parallel General Matrix Multiplication Massively parallel computing (e.g., for implementing general matrix multiplication (GEMM)) typically involves a large amount of data being streamed in and out of a processing device at the rate of the compute engine (also referred to as the compute array). This processing device for massively parallel computing may include, for example, a compute circuit such as a digital signal processor (DSP), which may be implemented by a programmable IC (e.g., an FPGA), and the compute array may be implemented by a DSP array in a programmable IC (e.g., the compute array 362 in the programmable IC 228). A typical massively parallel GEMM on an FPGA may employ thousands of DSP elements and entail streaming in tens of gigabytes per second (GB/s) of input data without stalling. Such a stream rate approaches the theoretical maximum double date rate (DDR) or input/output (I/O) bandwidth of most FPGA chips.

Conventionally, the data may typically be stored in faster memory, such as a look-up table (LUT), block random access memory (BRAM), or high bandwidth memory (HBM). Such memories are historically limited in size, unavailable, and/or not cost effective. Therefore, lack of large, fast I/O has led to scaling down the compute engine, thereby leaving system performance on the table.

Other alternatives can be application or compute-engine-specific. For example, alternatives may include caching any repeatedly loaded data or replacing a generic compute engine (e.g., a GEMM) with an application-specific one (e.g., a convolutional processor in neural networks). Such specialization increases development and verification cost. In addition, such specialization may entail employing a dedicated hardware resource or, on an FPGA, may incur the overhead of bitstream reloading.

Examples of the present disclosure provide a streaming data format for arbitrarily-sized matrix input data for GEMM computation implemented on a finite size GEMM accelerator in the form of a rectangular array of DSP elements or similar compute cores. This data format solves the issue of DDR limiting (e.g., due to DDR DRAM reads from RAM 226) the GEMM accelerator performance due to the non-sequential addressing bandwidth penalty that may range from five times (5×) for smaller data sizes to ten times (10×) or more for random access into many DDR pages.

Figure 6:
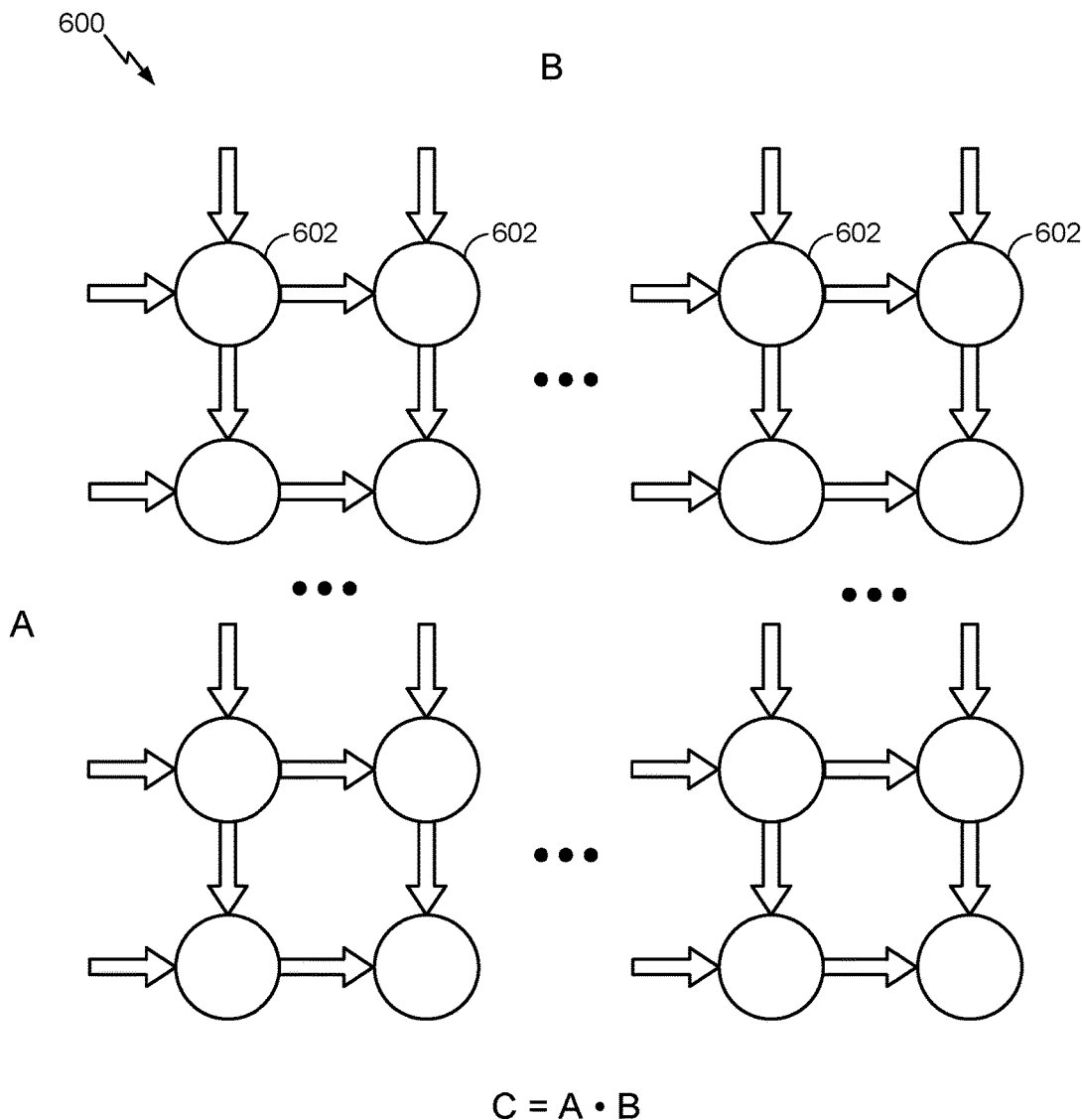
FIG. 6 illustrates an example compute array, in accordance with an example of the present disclosure.

FIG. 6 illustrates an example compute array 600, in accordance with an example of the present disclosure. The compute array 600 may have a systolic array structure of compute cores 602 suitable for use in massively parallel GEMM, for example. As used herein, a systolic array generally refers to a homogeneous network of coupled data processing units (DPUs), which may be referred to as cells or nodes. Each DPU (e.g., each compute core 602) may independently compute a partial result as a function of the data received from its upstream neighbors (e.g., to the left and/or above), stores the result within the DPU itself, and passes the received data and the result downstream (e.g., to the right and/or down). For matrix multiplication, each compute core 602 may multiply two elements (one from each matrix) together, store the product, and if additional matrix elements are input to this core, add the stored product to the next multiplication result. The compute array 600 may compute matrix operations C=A*B, where columns of matrix A flow left to right and rows of matrix B flow top to bottom, with matrix C being accumulated in local memory of the individual compute cores 602 and offloaded when the calculation is done. The compute array 362 in FIG. 3 may be implemented with the compute array 600, where matrix A is a weight matrix read from the FIFOs 360 and matrix B is an input data matrix read from the FIFOs 358. For some examples, the input data matrix may be an image matrix, voice samples, or channels of data from activation functions of a previous neural network layer.

Figure 7A:
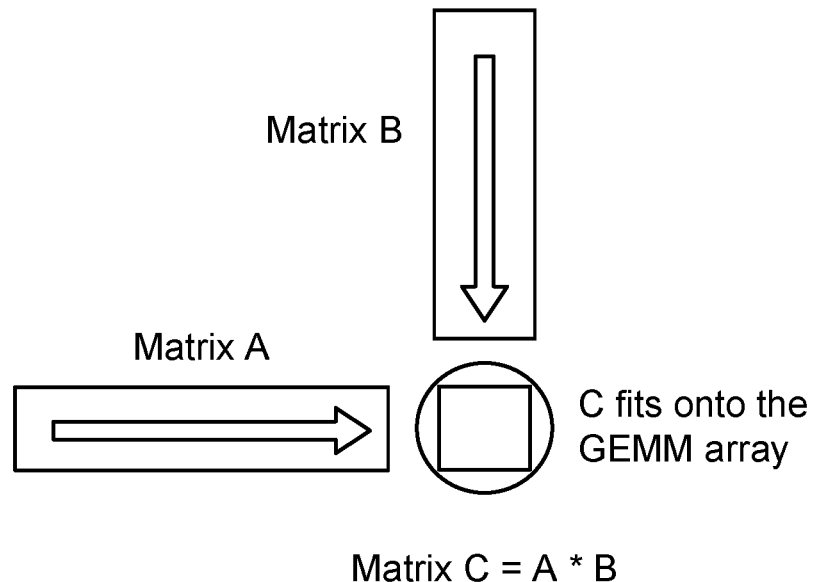
FIG. 7A illustrates streaming data from two example matrices into an example compute array, where the matrices fit onto the compute array.

Described below is the most efficient storage format for streaming data into the compute array, first on smaller matrices that fit onto the compute array and then for full, practical sizes. As illustrated in FIG. 7A where the matrices fit onto the GEMM array (e.g., the compute array 600), such data can be streamed from I/O or memory (e.g., RAM 226, which may be implemented with DDR DRAM) using the column-major format for matrix A and the row-major format for B. As used herein, column-major order generally refers to consecutive elements of a column in an array residing next to each other, whereas row-major order generally refers to consecutive elements of a row in the array residing next to each other. For example, in a 2×3 array (i.e., an array having 2 rows and 3 columns) with elements $a_{11}$, $a_{12}$, $a_{13}$, $a_{21}$, $a_{22}$, and $a_{23}$, the column major-order would be $a_{11}$, $a_{21}$, $a_{12}$, $a_{22}$, $a_{13}$, and $a_{23}$, reading down the columns first and then moving from left to right across the rows, whereas the row-major order would be $a_{11}$, $a_{12}$, $a_{13}$, $a_{21}$, $a_{22}$, and $a_{23}$, reading across the rows from left to right first and then moving from top to bottom down the columns. In the example of FIG. 7A, the rows or columns may be padded to the array dimensions up front or on the fly while streamed. In this case, the data is accessed with sequential addresses for both matrix A and matrix B and may thus be streamed without any performance penalty from the memory (e.g., the DDR DRAM).

Figure 7B:
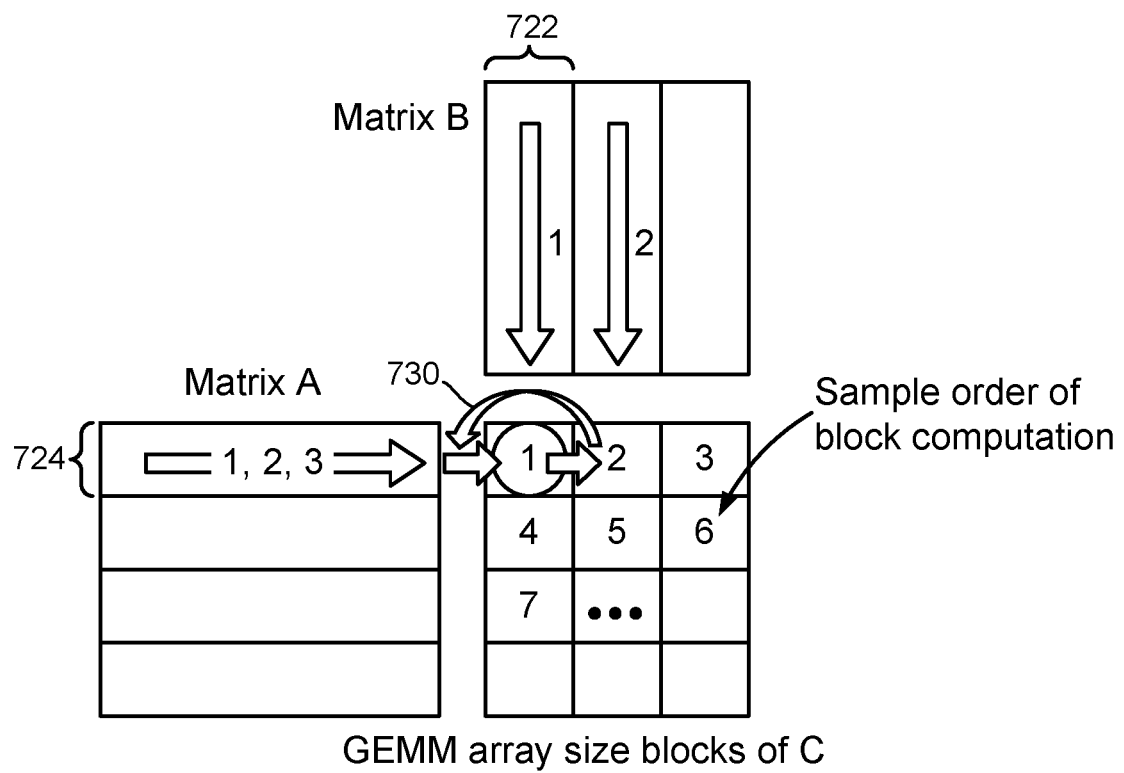
FIG. 7B illustrates streaming data from two example matrices into an example compute array, where the matrices are larger than the compute array, and performing block-based computation.

Such an implementation of a GEMM compute array (e.g., compute array 600) is limited in size in practice, whereas the matrices processed by the compute array can get arbitrarily large (e.g., a weight matrix and an image matrix in an artificial neural network). Therefore, a hierarchical or block-based partitioning may be used to decompose full size matrix C=A*B as a sequence of several computations (C_block=A_block*B_block) that fit into the compute array, as illustrated in FIG. 7B. FIG. 7B also illustrates an example order of block computation.

While computing the first block (block 1 in the example order) of the compute-array-size blocks of matrix C, the first columnar partition 722 of matrix B is streamed in, as well as the first row-like partition 724 of matrix A. The columnar partition 722 comprises as many columns as there are DPU columns in the compute array. Similarly, the row-like partition 724 comprises as many rows as there are DPU rows in the compute array. For the shown order, the portion of matrix A may be re-streamed, recirculated (as shown at arrow 730 in FIG. 7B), or buffered. In either matrix A or matrix B, the data is no longer accessed linearly. Due to this non-sequential access, the practical DDR bandwidth may most likely decrease, thereby limiting the GEMM compute array performance.

Figure 8:
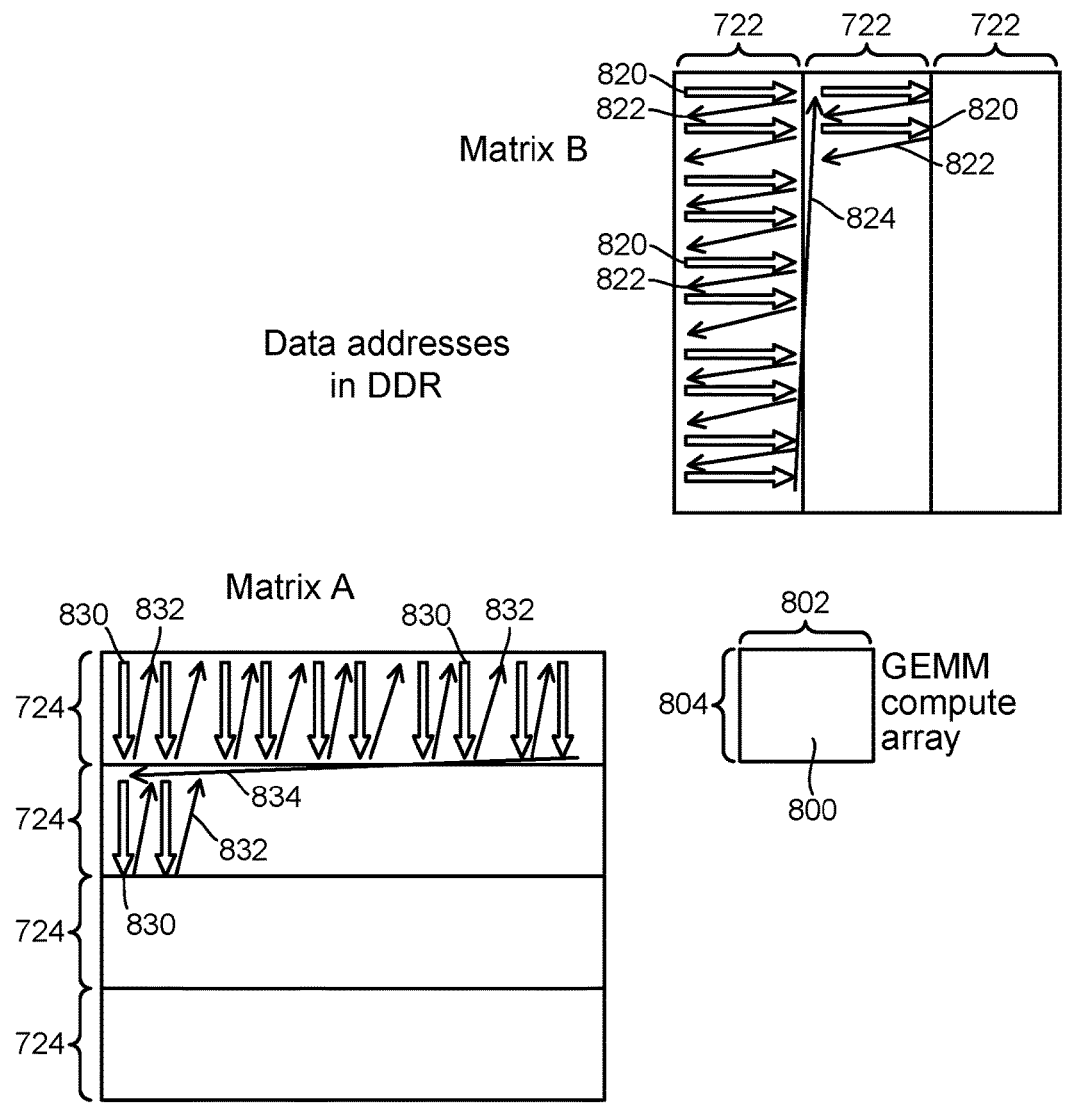
FIG. 8 illustrates a data order for two matrices based on the dimensions of a compute array, in accordance with an example of the present disclosure.

An example optimal DDR data order for storing and reading the data is illustrated in FIG. 8. The data format is a function of the compute array geometry (e.g., the dimensions of the compute array, such as the row size and the column size in a rectangular array). For a compute array, the row size of the compute array generally refers to the number of DPU rows therein, whereas the column size of the compute array generally refers to the number of DPU columns therein. In the columnar partitions 722 (which have the same width as the column size 802 of the example GEMM compute array 800), the data order proceeds first from left to right within each row of matrix B according to the arrows 820, and then from top to bottom within the columnar partition 722 according to the arrows 822, as illustrated. This represents a row-major order within each columnar partition 722. When the bottom, rightmost element of each columnar partition 722 is reached, the data order proceeds to the top, leftmost element in the next adjacent columnar partition to the right of the current partition, according to the arrow 824. In the row-like partitions 724 (which have the same height as the row size 804 of the example GEMM compute array 800), the data order proceeds first from top to bottom within each column of matrix A according to the arrows 830, and then from left to right within the row-like partition 724 according to the arrows 832, as illustrated. This represents a column-major order within each row-like partition 724. When the rightmost, bottom element of each row-like partition 724 is reached, the data order proceeds to the leftmost, top element in the next adjacent row-like partition beneath the current partition, according to the arrow 834.

Figure 9A:
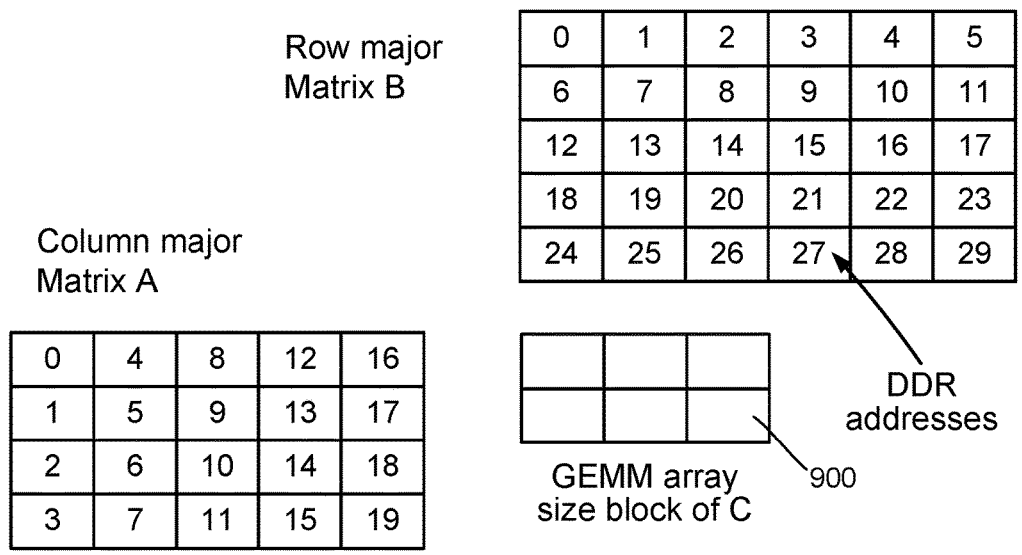
FIG. 9A illustrates an example standard column-major data order for one example matrix and an example standard row-major data order for another example matrix, with an example compute array.

As a specific example, FIG. 9A illustrates an example standard column-major data order for a 4×5 matrix A and an example standard row-major data order for a 5×6 matrix B, with an example 2×3 GEMM compute array 900. Due to the smaller dimensions of the GEMM compute array 900, the data in neither matrix A nor matrix B is accessed linearly with a block-based partitioning scheme. Due to this non-sequential access, the practical DDR bandwidth may most likely decrease, thereby limiting the GEMM compute array performance as described above.

Figure 9B:
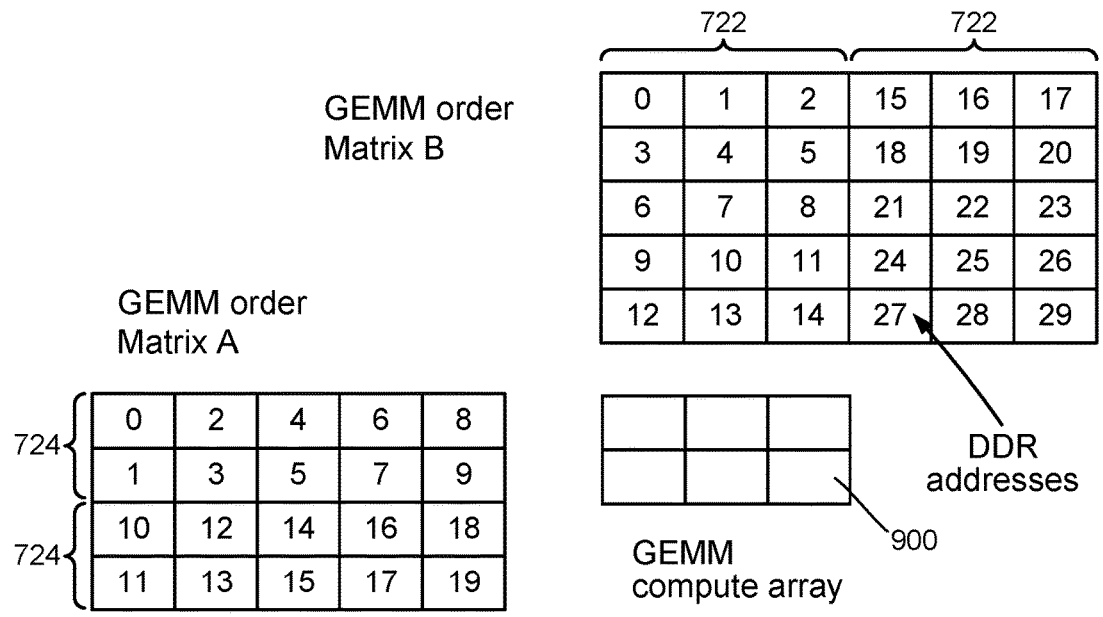
FIG. 9B illustrates the example matrices of FIG. 9A with a data order based on the dimensions of the example compute array, in accordance with an example of the present disclosure.

FIG. 9B illustrates an example optimized data order (labeled "GEMM order") for both matrix A and for matrix B, in accordance with an example of the present disclosure. The data order in FIG. 9B is a specific example based on the dimensions of the GEMM compute array 900, in accordance with the data order set forth in the description of FIG. 8. The data order in FIG. 9B offers the highest DDR streaming throughput, since the DDR addresses are sequential when accessed with a block-based partitioning scheme using the GEMM compute array 900.

In the example of FIG. 9B, the columnar partitions 722 are three elements wide, according to the column size (=3) of the GEMM compute array 900. The row-like partitions 724 are 2 elements tall, according to the row size (=2) of the GEMM compute array 900. One can see how the data order in FIG. 9B follows the arrows 820, 822, 824, 830, 832, and 834 of FIG. 8.

Although examples of the present disclosure focus on using the data format described herein for GEMM as an example application and for ease of understanding, this data format may also be employed for many other applications, such as other data-intensive compute algorithms. For example, in the space of machine learning, this data format may be utilized for other operations typically performed together with GEMM, such as data batching or padding. Furthermore, the data format can be customized by partial linearization to either the capability of a specific DDR controller, or based on the availability of data caches (e.g., high bandwidth memory (HBM) or BRAM). In other words, the memory bank associated with the data may be divided into multiple memory chips, and the layout of these multiple memory chips and the switching therebetween when reading from these different memory chips may be designed to avoid delays during reads (i.e., to continuously read). These delays may be due, for example, to a reset of a memory chip upon reaching its read limit. For some examples, a system may be designed utilizing the data format described herein in conjunction with this memory division in an effort to avoid such delays when reading from memory and to maximize (or at least increase) bandwidth.

Example Operations for Matrix Processing

Figure 10:
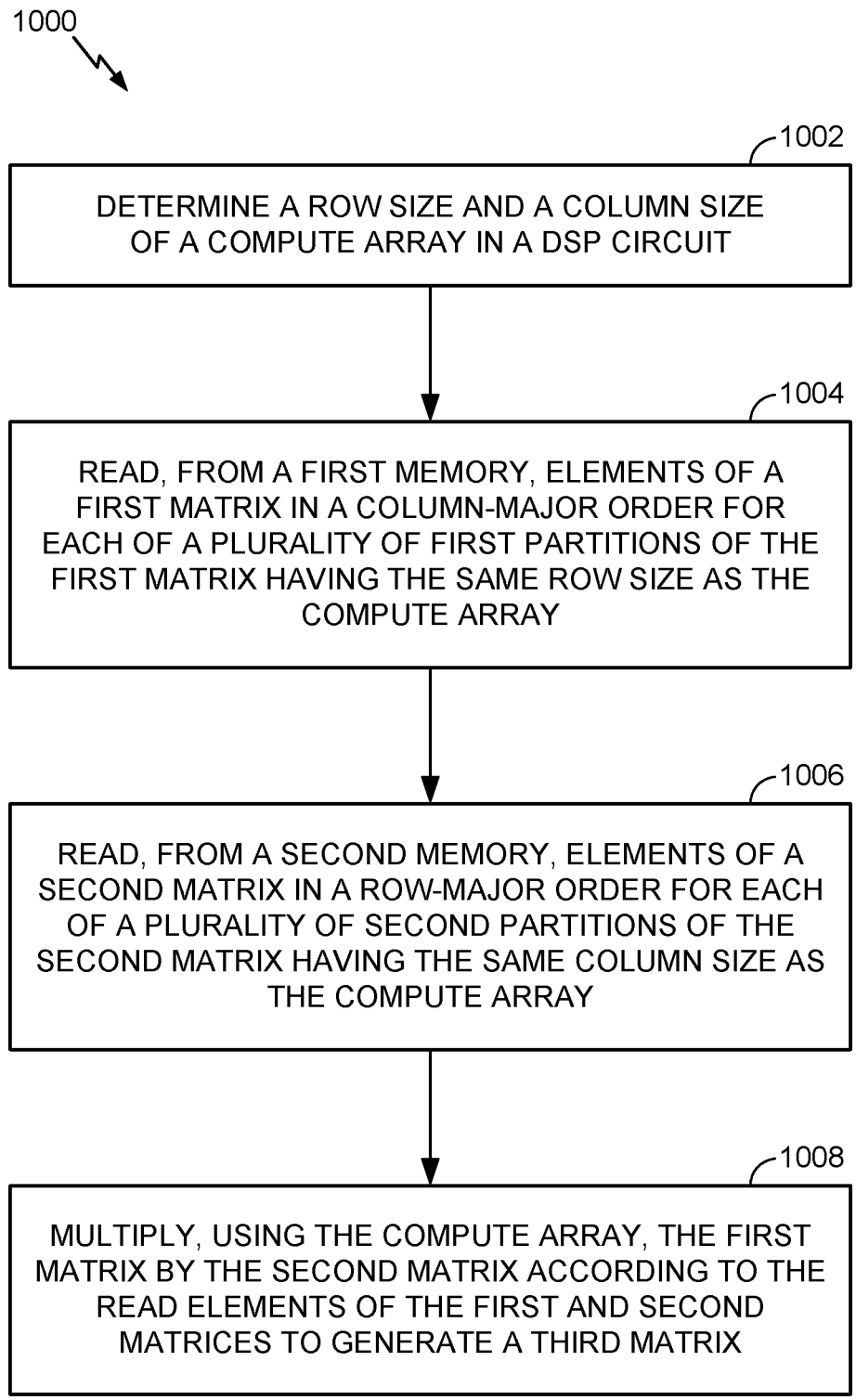
FIG. 10 is a flow diagram of example operations for multiplying matrices in hardware, in accordance with an example of the present disclosure.

FIG. 10 is a flow diagram of example operations 1000 for multiplying matrices in hardware, in accordance with an example of the present disclosure. The operations 1000 may be performed, for example, by an electronic circuit, which may include a compute circuit and memory. For some examples, the electronic circuit may comprise a hardware accelerator (e.g., hardware accelerator 116) comprising a programmable IC (e.g., programmable IC 228) with a compute array 362 functioning as a GEMM compute array.

The operations 1000 may begin, at block 1002, by determining a row size and a column size of a compute array (e.g., the compute array 362) in a compute circuit. As described above, the row size of the compute array may represent the number of DPU rows therein, whereas the column size of the compute array may represent the number of DPU columns therein. At block 1004, the electronic circuit (e.g., the cache 348, the read control circuit 350, the FIFOs 360, and/or the compute array 362) may (sequentially) read, from a first memory (e.g., RAM 226), elements of a first matrix (e.g., matrix A) in a column-major order for each of a plurality of first partitions (e.g., row-like partitions 724) of the first matrix having the same row size (e.g., row size 804) as the compute array. At block 1006, the electronic circuit (e.g., the read control circuit 346, the FIFOs 358, and/or the compute array 362) may (sequentially) read, from a second memory (e.g., RAM 226), elements of a second matrix (e.g., matrix B) in a row-major order for each of a plurality of second partitions (e.g., columnar partitions 722) of the second matrix having the same column size (e.g., column size 802) as the compute array. At block 1008, the electronic circuit may multiply, using the compute array, the first matrix by the second matrix according to the (sequentially) read elements of the first and second matrices to generate a third matrix (e.g., matrix C).

The multiplication results (the elements of matrix C) may be off-loaded from the compute array after the last element of each partition passes through a specific DPU. Then, this DPU's local accumulator may be reset to 0, and matrix multiplication may continue uninterrupted.

According to some examples, the compute array comprises a rectangular array of DSP elements (e.g., the compute array 600) arranged according to the row size and the column size.

According to some examples, dimensions of at least one of the first matrix or the second matrix are larger than the row size and the column size of the compute array.

According to some examples, reading the elements of the first matrix at block 1004 includes accessing the elements of the first matrix with first sequential memory addresses (e.g., sequential DDR addresses). As used herein, sequential memory addresses generally refer to addresses in memory that may be accessed according to an incremented sequence. For some examples, reading the elements of the second matrix at block 1006 involves accessing the elements of the second matrix with second sequential memory addresses.

According to some examples, the multiplying at block 1008 entails performing, using the compute array, block-based computation of the third matrix based on the row size and the column size of the compute array.

According to some examples (e.g., in machine-learning applications), the first matrix is a weight matrix. In this case, the second matrix may be an input data matrix (e.g., an image matrix).

According to some examples, the compute array is implemented as a DSP array in a programmable IC. For other examples, the compute array may be implemented in an application-specific integrated circuit (ASIC) or in an application-specific standard product (ASSP).

According to some examples, the first memory is a first location in a double data rate (DDR) dynamic random access memory (DRAM), and the second memory is a second location in the same DDR DRAM.

Figure 11:
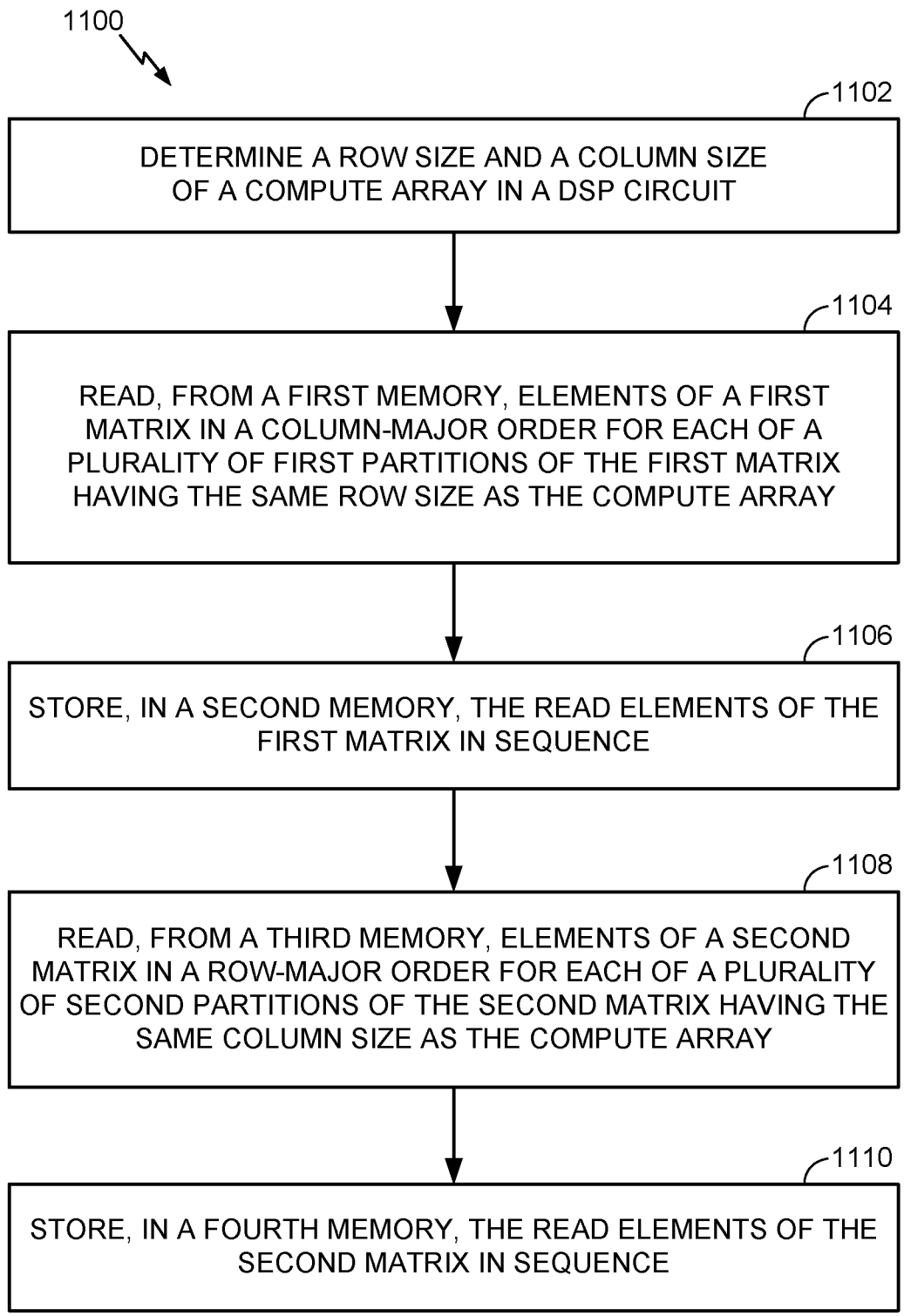
FIG. 11 is a flow diagram of example operations for processing matrices in hardware, in accordance with an example of the present disclosure.

FIG. 11 is a flow diagram of example operations 1100 for processing matrices in hardware, in accordance with an example of the present disclosure. The operations 1100 may be performed, for example, by an electronic circuit, which may include a compute circuit and memory. For some examples, the electronic circuit may comprise a hardware accelerator (e.g., hardware accelerator 116) comprising a programmable IC (e.g., programmable IC 228) with a compute array 362 functioning as a GEMM compute array.

The operations 1100 may begin, at block 1102, by determining a row size and a column size of a compute array (e.g., the compute array 362) in a compute circuit. As described above, the row size of the compute array may represent the number of DPU rows therein, whereas the column size of the compute array may represent the number of DPU columns therein. At block 1104, the electronic circuit may (sequentially) read, from a first memory, elements of a first matrix in a column-major order for each of a plurality of first partitions of the first matrix having the same row size as the compute array. At block 1106, the electronic circuit may store, in a second memory, the (sequentially) read elements of the first matrix in sequence. At block 1108, the electronic circuit may (sequentially) read, from a third memory, elements of a second matrix in a row-major order for each of a plurality of second partitions of the second matrix having the same column size as the compute array. At block 1110, the electronic circuit may store, in a fourth memory, the (sequentially) read elements of the second matrix in sequence.

According to some examples, storing in the second memory at block 1106 involves storing the read elements of the first matrix in sequence according to first sequential memory addresses. For some examples, storing in the fourth memory at block 1110 includes storing the read elements of the second matrix in sequence according to second sequential memory addresses.

According to some examples, the operations 1100 further entail sequentially reading, from the second memory, the stored elements of the first matrix according to first sequential memory addresses; sequentially reading, from the fourth memory, the stored elements of the second matrix according to second sequential memory addresses; and multiplying, using the compute array, the first matrix by the second matrix according to the sequentially read stored elements of the first and second matrices to generate a third matrix.

According to some examples, the first memory and the second memory are two different memory locations in a same memory. For some examples, the third memory and the fourth memory are two different memory locations in a same memory. For some examples, the first, second, third, and fourth memories are different memory locations in a same memory.

According to some examples, the compute array comprises a rectangular array of DSP elements (e.g., the compute array 600) arranged according to the row size and the column size.

According to some examples (e.g., in machine-learning applications), the first matrix is a weight matrix. In this case, the second matrix may be an input data matrix (e.g., an image matrix).

Examples of the present disclosure provide techniques and apparatus for ordering data flowing into and out of massively parallel GEMM (e.g., implemented in FPGAs or other programmable ICs) in an effort to avoid I/O and DDR bottlenecks. The data may be arranged such that core-wide words can be loaded into the compute array fast (e.g., in one clock cycle) while being accessed at full burst speed with sequential addresses from DDR. This provides a device-independent data format that gives the DDR controller (e.g., memory controller 310) the best chance to both deliver near theoretical bandwidth burst speed, as well as minimize (or at least reduce) stalls due to DDR page changes and refresh.

As used herein (including the claims that follow), a phrase referring to "at least one of" a list of items refers to any combination of those items, including single members. As an example, "at least one of: x, y, and z" is intended to cover x, y, z, x-y, x-z, y-z, x-y-z, and any combination thereof (e.g., x-y-y and x-x-y-z).

While the foregoing is directed to examples of the present disclosure, other and further examples of the disclosure may be devised without departing from the basic scope thereof, and the scope thereof is determined by the claims that follow.

What is claimed is:

1. A method for multiplying matrices in hardware, comprising:
   determining a row size and a column size of a compute array in a compute circuit;
   reading, from a first memory, elements of a first matrix in a column-major order for each of a plurality of first partitions of the first matrix having the same row size as the compute array;
   reading, from a second memory, elements of a second matrix in a row-major order for each of a plurality of second partitions of the second matrix having the same column size as the compute array; and
   multiplying, using the compute array, the first matrix by the second matrix according to the read elements of the first and second matrices to generate a third matrix.

2. The method of claim 1, wherein the compute array comprises a rectangular array of digital signal processing (DSP) elements arranged according to the row size and the column size.

3. The method of claim 1, wherein dimensions of at least one of the first matrix or the second matrix are larger than the row size and the column size of the compute array.

4. The method of claim 1, wherein:
   reading the elements of the first matrix comprises accessing the elements of the first matrix with first sequential memory addresses; and
   reading the elements of the second matrix comprises accessing the elements of the second matrix with second sequential memory addresses.

5. The method of claim 1, wherein the multiplying comprises performing, using the compute array, block-based computation of the third matrix based on the row size and the column size of the compute array.

6. The method of claim 1, wherein the first matrix comprises a weight matrix and wherein the second matrix comprises an image matrix.

7. The method of claim 1, wherein the compute array is implemented as a digital signal processing (DSP) array in a programmable IC.

8. An electronic circuit comprising:
   a first memory configured to store elements of a first matrix;
   a second memory configured to store elements of a second matrix; and
   a compute circuit comprising a compute array having a row size and a column size, the compute circuit being coupled to the first memory and the second memory and configured to:
     read, from the first memory, the elements of the first matrix in a column-major order for each of a plurality of first partitions of the first matrix having the same row size as the compute array;
     read, from the second memory, elements of the second matrix in a row-major order for each of a plurality of second partitions of the second matrix having the same column size as the compute array; and
     multiply, using the compute array, the first matrix by the second matrix according to the read elements of the first and second matrices to generate a third matrix.

9. The electronic circuit of claim 8, wherein the compute array comprises a rectangular array of digital signal processing (DSP) elements arranged according to the row size and the column size.

10. The electronic circuit of claim 8, wherein dimensions of at least one of the first matrix or the second matrix are larger than the row size and the column size of the compute array.

11. The electronic circuit of claim 8, wherein the compute circuit is configured to:
    read the elements of the first matrix by accessing the elements of the first matrix with first sequential memory addresses; and
    read the elements of the second matrix by accessing the elements of the second matrix with second sequential memory addresses.

12. The electronic circuit of claim 8, wherein the compute circuit is configured to multiply the first matrix by the second matrix by performing, using the compute array, block-based computation of the third matrix based on the row size and the column size of the compute array.

13. The electronic circuit of claim 8, wherein the first matrix comprises a weight matrix and wherein the second matrix comprises an image matrix.

14. The electronic circuit of claim 8, wherein the electronic circuit comprises a programmable integrated circuit (IC) and wherein the compute array is implemented as a digital signal processing (DSP) array in the programmable IC.

15. The electronic circuit of claim 8, wherein the first memory comprises a first location in a double data rate (DDR) dynamic random access memory (DRAM) and wherein the second memory comprises a second location in the same DDR DRAM.

16. A method of processing matrices in hardware, comprising:
    determining a row size and a column size of a compute array in a compute circuit;
    reading, from a first memory, elements of a first matrix in a column-major order for each of a plurality of first partitions of the first matrix having the same row size as the compute array;
    storing, in a second memory, the read elements of the first matrix in sequence;
    reading, from a third memory, elements of a second matrix in a row-major order for each of a plurality of second partitions of the second matrix having the same column size as the compute array; and
    storing, in a fourth memory, the read elements of the second matrix in sequence.

17. The method of claim 16, wherein:
    storing in the second memory comprises storing the read elements of the first matrix in sequence according to first sequential memory addresses; and
    storing in the fourth memory comprises storing the read elements of the second matrix in sequence according to second sequential memory addresses.

18. The method of claim 16, further comprising:
    sequentially reading, from the second memory, the stored elements of the first matrix according to first sequential memory addresses;
    sequentially reading, from the fourth memory, the stored elements of the second matrix according to second sequential memory addresses; and multiplying, using the compute array, the first matrix by the second matrix according to the sequentially read stored elements of the first and second matrices to generate a third matrix.

19. The method of claim 16, wherein at least one of:

the first memory and the second memory are two different memory locations in a same memory; or the third memory and the fourth memory are two different memory locations in a same memory.

20. The method of claim 16, wherein:

the compute array comprises a rectangular array of digital signal processing (DSP) elements arranged according to the row size and the column size;

the first matrix comprises a weight matrix; and the second matrix comprises an image matrix.

* * * * *